US007651778B2

(12) United States Patent
Tamemasa

(10) Patent No.: US 7,651,778 B2
(45) Date of Patent: Jan. 26, 2010

(54) LAMINATED BODY AND PRODUCING METHOD THEREOF, FIXING BELT, FIXING DEVICE AND IMAGE FORMING DEVICE

(75) Inventor: Hiroshi Tamemasa, Minamiashigara (JP)

(73) Assignee: Fuji Xerox, Ltd., Tokyo (JP)

( * ) Notice: Subject to any disclaimer, the term of this patent is extended or adjusted under 35 U.S.C. 154(b) by 32 days.

(21) Appl. No.: 11/783,030

(22) Filed: Apr. 5, 2007

(65) Prior Publication Data

US 2008/0057335 A1 Mar. 6, 2008

(30) Foreign Application Priority Data

Aug. 31, 2006 (JP) ............................ 2006-235725

(51) Int. Cl.
*B32B 15/04* (2006.01)
*B32B 15/06* (2006.01)
*B32B 15/08* (2006.01)
*B32B 9/00* (2006.01)

(52) U.S. Cl. ....................... 428/469; 428/459; 428/461; 428/462; 428/463; 428/465; 428/458

(58) Field of Classification Search ...................... None
See application file for complete search history.

(56) References Cited

U.S. PATENT DOCUMENTS 7,215,916 B2 * 5/2007 Kishino et al. .............. 399/329
2004/0105996 A1 * 6/2004 Takagi et al. ................ 428/606
2005/0142351 A1 * 6/2005 Takagi et al. ................ 428/323
2007/0147915 A1 * 6/2007 Kishino et al. .............. 399/329

FOREIGN PATENT DOCUMENTS

| | | |
|---|---|---|
| JP | A 01-319641 | 12/1989 |
| JP | A 05-006765 | 1/1993 |
| JP | B2 05-009027 | 2/1993 |
| JP | A 05-317807 | 12/1993 |
| JP | A 07-114276 | 5/1995 |
| JP | A 10-296942 | 11/1998 |
| JP | A 2000-200610 | 7/2000 |
| JP | 2001205353 A * | 7/2001 |
| JP | A 2002-127296 | 5/2002 |
| JP | A 2002-198255 | 7/2002 |
| JP | A 2003-013257 | 1/2003 |
| JP | A 2006-091568 | 4/2006 |

OTHER PUBLICATIONS

Computer generated translation of Ogawa et al. (JP05317807A).*
Computer generated translation of Motobe et al. (JP10296942A).*
Computer generated translation of Maeyama (JP2002127296A).*

(Continued)

*Primary Examiner*—John J. Zimmerman
*Assistant Examiner*—Aaron Austin
(74) *Attorney, Agent, or Firm*—Oliff & Berridge, PLC

(57) ABSTRACT

There is provided a laminated body that includes a metal layer comprising an electroconductive metal layer and a metal oxide layer disposed on each side of the electroconductive metal layer; and a resin layer or an elastic layer disposed on at least one side of the metal layer. There is also provided a producing method of the laminated body. Furthermore, there is provided a fixing belt and an image forming device.

16 Claims, 4 Drawing Sheets

OTHER PUBLICATIONS

Computer generated translation for Ishikawa: JP2001205353A—Jul. 2001.*

Computer generated translation of Ogawa et al. (JP05317807A), Dec. 3, 1993.*

Computer generated translation of Motobe et al. (JP10296942A), Nov. 10, 1998.*

Computer generated translation of Maeyama (JP2002127296A), May 8, 2002.*

* cited by examiner

LAMINATED BODY AND PRODUCING METHOD THEREOF, FIXING BELT, FIXING DEVICE AND IMAGE FORMING DEVICE

CROSS-REFERENCE TO RELATED APPLICATIONS

This application is based on and claims priority under 35 USC 119 from Japanese Patent Application No. 2006-235725 filed on Aug. 31, 2006.

BACKGROUND

1. Technical Field

The invention relates to a laminated body and a producing method thereof, and a fixing belt, a fixing device and an image forming device.

2. Related Art

In an electrophotographic image forming device that uses a dry toner, a fixing device that heats and pressurizes a toner image to fix the toner image on a surface of a recording medium has conventionally been provided with a fixing roll in which a toner releasing layer is disposed on an outer periphery surface of a metal core bar and a halogen heater for heating is disposed inside of the metal core bar.

In a fixing device or an image forming device that uses an endless belt, when the endless belt is bent to have a large curvature, the endless belt can be disposed within a limited space. Furthermore, in the case of the endless belt being used as a fixing belt, when the endless belt is bent to have a large curvature, a recording medium, conveyed to a contact portion formed by the endless belt and a pressure member that is pressed against the endless belt, can be excellently peeled off the endless belt.

SUMMARY

According to an aspect of the invention, there is provided a laminated body comprising:

a metal layer comprising an electroconductive metal layer and a metal oxide layer disposed on each side of the electroconductive metal layer; and a resin layer or an elastic layer disposed on at least one side of the metal layer.

BRIEF DESCRIPTION OF THE DRAWINGS

Exemplary embodiments of the present invention will be described in detail based on the following drawings, wherein.

DETAILED DESCRIPTION

In what follows, the invention will be detailed with reference to the drawings.

<Laminated Body and Producing Method Thereof>

A laminated body of an aspect of the invention includes at least: a metal layer including an electroconductive metal layer and a metal oxide layer disposed on each side of the electroconductive metal layer; and a resin layer or an elastic layer disposed on at least one side of the metal layer. In an exemplary embodiment, the laminated body may include: a metal layer including an electroconductive metal layer and a metal oxide layer disposed on each side of the electroconductive metal layer; a resin layer or an elastic layer disposed on one side of the metal layer; and a resin layer or an elastic layer disposed on the other side of the metal layer.

The laminated body of an aspect of the invention may be used in a fixing belt or a pressure belt such as an endless belt as described below. The laminated body of an aspect of the invention may be used as well to pressure-adhere plural sheets by heating in a laminating process. In this case, when shearing force is applied due to external force on the laminated body, or when the laminated body is bent, the metal layer of conventional belts that have a metal layer and resin layer may be cracked or destroyed.

In what follows, a configuration of a laminated body of an aspect of the invention and a producing method thereof will be described together.

Figure 1:
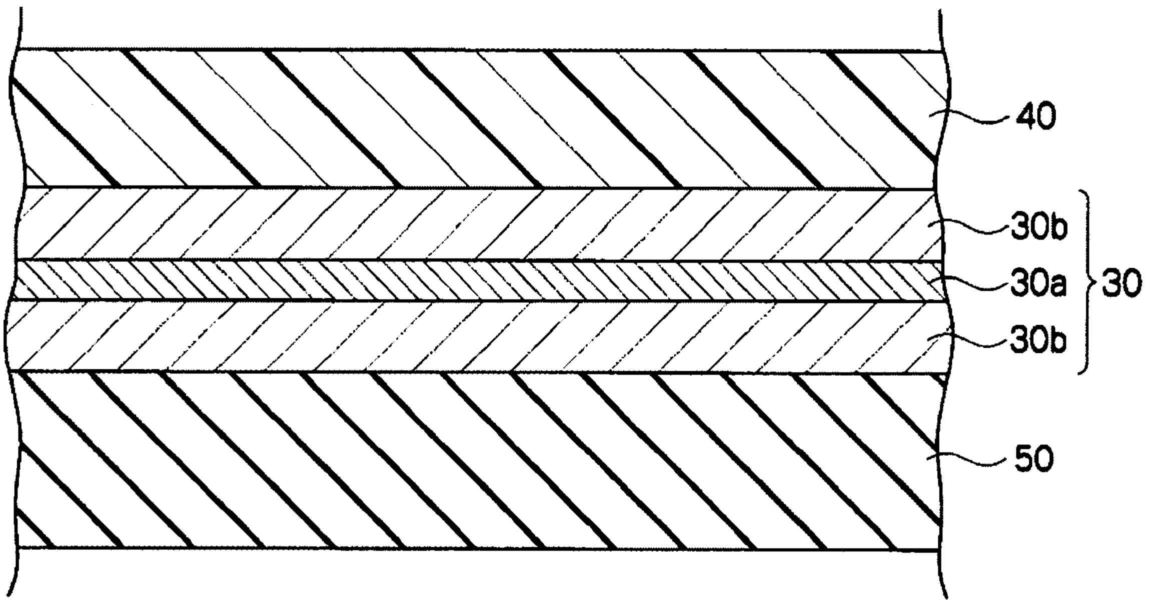
FIG. 1 is a schematic sectional view showing an example of a laminated body of an aspect of the invention.

FIG. 1 is a schematic sectional view showing an example of a configuration of a laminated body of an aspect of the invention. In FIG. 1, a reference numeral 30 denotes a metal layer; on one side (the upper side in the drawing) of the metal layer 30, a resin layer 40 is disposed, and on the other side thereof (the lower side in the drawing) an elastic layer 50 is disposed. The metal layer 30 is configured to include an electroconductive metal layer 30*a*, each side of which is provided with a metal oxide layer 30*b*. The configuration shown in FIG. 1 is an example of the laminated body of an aspect of the invention, wherein one side of the metal layer 30 of the laminated body is provided with a resin layer and the other side of the metal layer 30 of the laminated body is provided with an elastic layer. However, each side of the metal layer 30 of the laminated body may be provided with a resin layer. Alternatively, each side of the metal layer 30 of the laminated body may be provided with an elastic layer.

(Metal Layer)

As mentioned above, the metal layer 30 is configured to include an electroconductive metal layer 30*a*, each side of which is provided with a metal oxide layer 30*b*. The electroconductive metal layer 30*a* may generate an eddy current due to the electromagnetic induction to generate heat and may include a metal of which volume resistivity is $1\times10^3$ Ωcm or less.

A material of the electroconductive metal layer 30*a* is selected depending on an application of the laminated body and is not particularly restricted. However, from the viewpoints of capability of efficiently generating heat due to the electromagnetic induction described below, the electroconductive metal layer 30*a* may include a metallic material such as copper, nickel, iron, aluminum, titanium, cobalt, tin, lead or alloys thereof.

A thickness of the electroconductive metal layer 30*a* is preferably in the range of 3 to 70 μm and more preferably in the range of 5 to 40 μm. When the thickness thereof is less than 3 μm, the resistance of an entire metal layer may become large and in some cases an effective amount of heat generation cannot be obtained. When the thickness thereof exceeds 70 μm, since a resistance value for instance when the metal layer is used as a heat-generating layer may become smaller and the heat capacity of an entire metal layer may become larger, effective heat generation cannot be obtained in some cases.

On each surface of the electroconductive metal layer 30*a* (upper and lower sides in the drawing), a metal oxide layer 30*b* is disposed. The metal oxide layer 30*b* may improve the adhesiveness between the metal layer 30 and the resin layer 40 or the elastic layer 50 and, when the metal oxide layer 30*b* is disposed on each side of the electroconductive metal layer 30*a* as shown in FIG. 1, cracks due the external pressure or the deformation in the electroconductive metal layer 30*a* may be inhibited from occurring.

A material of the metal oxide layer 30*b* is not particularly restricted. An oxide of a metal capable of using as the electroconductive metal layer 30*a* may be used.

A thickness of the metal oxide layer 30*b* is preferably in the range of 1 to 30 μm and more preferably in the range of 5 to 20 μm. When the thickness is less than 1 μm, in some cases, excellent adhesiveness with the resin layer 40 or the elastic later 50 cannot be obtained. When it exceeds 30 μm, since an entire thickness including the electroconductive metal layer 30*a* may become too thick, when it is formed into a belt described below, in some cases, the flexibility cannot be obtained.

A metal oxide forming process for making both surfaces of the electroconductive metal layers 30*a* insulating ($1\times10^8$ Ωcm or more by the volume resistivity) metal oxide layer 30*b*, as far as it is a process that can form and stick a metal oxide on a surface to be processed, is not particularly restricted.

According to an aspect of the invention, a metal layer 30 in which a metal oxide layer 30*b* is disposed on each of both sides of the electroconductive metal layer 30*a* is prepared as follows. In the beginning, a metal substrate is formed (forming a metal substrate) and, in the next place, both surfaces of the metal substrate are oxidized (oxidizing) to finally form a metal layer 30 including the three layers.

A shape of the metal substrate is not particularly restricted and may be any shape such as plate, sheet, film or cylinder. As a forming method thereof (forming a metal substrate), an electrochemical method such as a plating method, an electroplating method or an electroless plating method; a dry deposition method such as a vacuum deposition method or a sputtering method; a method utilizing the plastic deformation such as rolling, drawing or pressing; or the like can be cited. From the viewpoints of obtaining a metal layer with a high strength, the forming method may be a method utilizing the plastic deformation. Specific examples of the method utilizing the plastic deformation include a deep drawing method, a spinning method, a press method and a rotary forming method.

Metal crystals of a metal substrate formed by the plating method are arranged with a certain directionality and therefore, are different from metal crystals of a metal substrate formed by making use of the plastic deformation of metal. The difference therebetween can be confirmed by observing a crystal structure of the electroconductive metal layer 30*a* from a section of the final laminated body with an optical microscope or an electron microscope (for instance, a scanning electron microscope (SEM)).

Specifically, in the case of a metal substrate formed by rolling, in a section, crystals of the metal are arranged in a plane direction (a direction vertical to a thickness direction) and in the case of a metal substrate formed by the plating, in a section, crystals of the metal are arranged in a thickness direction (a direction in parallel with a thickness direction). Here, the plane direction means a direction that forms an angle of 0° or more and less than 45° to a surface of the metal substrate and the thickness direction means a direction that forms an angle of 45° or more and 90° or less to the surface of the metal substrate.

In the next place, as the oxidizing process, for instance a wet electrolysis method or a heat treatment in an oxidizing atmosphere may be carried out. Furthermore, when a finally obtained laminated body is used as an endless belt, in order to make an entire heat capacity smaller, a dense metal oxide layer may be formed for using a metal oxide layer 30*b* as a base material. This can be achieved when conditions of the wet electrolysis method or the heat treatment in an oxidizing atmosphere are optimized.

By the oxidizing, a metal layer 30 wherein a metal that is used in the initially prepared metal substrate becomes an electroconductive metal layer 30*a* as it is at a center portion and an oxide of the metal is formed on each side as a metal oxide layer 30*b* can be obtained.

In order to obtain a metal layer with a high strength as mentioned above, a method utilizing plastic deformation such as rolling may be used. However, in existing processing technology that utilizes plastic deformation, when for instance a laminated body is to be used as a heat generator, the electroconductive metal layer 30*a* cannot be formed with a film thickness suitable for a heat generating layer, i.e. approximately 10 μm.

Therefore, in an aspect of the invention, in order to obtain a thin and sufficiently strong electroconductive metal layer 30*a*, a metal substrate having a film thickness of 40 to 50 μm may be formed by use of a processing (rolling) method utilizing plastic deformation, and then, on each side thereof an insulating metal oxide layer 30*b* having a film thickness of approximately 15 μm may be formed, thereby forming a heat generating layer (electroconductive metal layer 30*a*) with a film thickness of approximately 10 μm from the metal substrate that is formed by use of a processing (rolling) method utilizing plastic deformation. Since the formed metal oxide layer 30*b* also works as a layer that reinforces the electroconductive metal layer 30*a* that is not oxidized, the metal layer 30 in an aspect of the invention may have excellent endurance.

(Resin Layer)

A resin layer 40 that can be disposed on a surface of the metal oxide layer 30*b* is selected depending on applications of the laminated body and not restricted particularly. The resin layer 40 may include for instance an inorganic material, an organic material or a composite material thereof. Furthermore, depending on applications, in some cases, when the formed metal oxide layer described below is used as a base material, the heat capacity of an entire endless belt can be made smaller.

In particular, the resin may be heat-resistant (hardly decomposable even at 300° C.) and excellent in the releasing property. From the viewpoint of, for instance, excellent releasing property, the resin layer may include at least one selected from a fluororesin, a silicone resin, a polyimide resin, a polyamide resin or a polyamide imide resin.

Examples of the fluororesin include PFA (tetrafluoroethylene-perfluoroalkyl vinyl ether copolymer), PTFE (polytetrafluoroethylene), FEP (tetrafluoroethylene-hexafluoropropylene copolymer), and composite materials thereof. Examples of the silicone resin include dimethylsilicone resin, dimethylethylsilicone resin, diethylsilicone resin, diphenylsilicone resin, dimethylphenylsilicone resin, diethylphenylsilicone resin and composite materials thereof. Only one of these may be used or two or more may be used in a combination.

The polyimide resin can be obtained by polymerizing substantially equimole of a tetracarboxylate dianhydride and a diamine compound. As the tetracarboxylate dianhydride, an aromatic tetracarboxylate dianhydride may be used and, as the diamine, an aromatic diamine may be used.

A thickness of the resin layer 40 is preferably in the range of 30 to 200 μm and more preferably in the range of 50 to 100 μm.

When the thickness of the resin layer 40 is less than 30 μm, when it is formed into an endless belt, in some cases, the strength becomes insufficient or heat-shielding effect to an inner periphery side of the endless belt becomes insufficient. Furthermore, in the case of the thickness of the resin layer 40 exceeding 200 μm, when it is formed into an endless belt, the heat capacity may become larger; accordingly, in some cases, loss of consumption power is caused and a warm-up time becomes longer.

As a method of forming the resin layer 40, an electrostatic powder coating method, spray coating method, dip coating method, centrifugal filming method or the like may be used (layer forming).

(Elastic Layer)

The elastic layer 50 that can be formed on a surface of the metal oxide layer 30*b* is selected depending on applications of the laminated body and not particularly restricted. However, for instance, from the viewpoint of capability of obtaining excellent elasticity and heat resistance, the elastic layer may be a heat-resistant elastic layer that includes a silicone rubber or a fluorinated rubber. The elastic layer means a layer that includes a material that, even when it is deformed under external pressure of 100 Pa or less, can restore its initial shape.

Examples of the silicone rubber include vinylmethylsilicone rubber, methylsilicone rubber, phenylmethylsilicone rubber, fluorosilicone rubber and composite materials thereof. Examples of the fluorinated rubber, fluorinated vinylidene rubber, tetrafluoroethylene/propylene rubber, tetrafluoroethylene/(perfluoromethyl vinyl ether) rubber, phosfazene rubber, fluoropolyether and other fluorinated rubbers. One of these may be used or two or more of these may be used in combination.

A thickness of the elastic layer 50 is desirably in the range of 30 to 500 μm and more desirably in the range of 100 to 300 μm. When the thickness is smaller than 30 μm, when an endless belt is formed thereof, in some cases, an outer periphery surface becomes hard and the gloss irregularity occurs. Furthermore, when the thickness is larger than 500 μm, when an endless belt is formed therefrom, in some cases, the heat capacity becomes larger and the warm-up time becomes longer.

Furthermore, as the hardness of the elastic layer 50, the hardness by a durometer hardness test using a type A durometer specified in JIS K6253 (1997), the disclosure of which is incorporated by reference herein, may be in the range of A5 to A40. The hardness of the elastic layer can be measured with a specimen obtained by cutting out an elastic layer from the laminated body.

As a method of forming the elastic layer 50, a ring coating method, dip coating method, injection molding method or the like may be used (layer forming).

The resin layer and elastic layer that may include materials as mentioned above and a releasing layer that will be described below, as needs arise, may include a lubricant, plasticizer, electroconductive particles, anti-oxidizing agent and other additives. The additives may be added in advance in coating liquids for forming the above-mentioned respective layers and used.

The above-mentioned laminated body of an aspect of the invention can be used without particular restriction basically in all applications where a laminated body having at least the metal layer and the resin layer or elastic layer is used. However, the laminated body of an aspect of the invention may be effectively used in applications where, in particular, the heat capacity is demanded not to increase and heating and cooling are repeated.

Furthermore, the laminated body can be preferably used as, for instance, a roll or belt intermediate transfer member or fixing member in an image forming device typical in a printer or a copy machine that forms an image formed from toner.

<Fixing Belt>

A fixing belt of an aspect of the invention uses the laminated body of an aspect of the invention and normally is an endless belt.

In the case of the fixing belt that includes an electroconductive metal layer and a resin layer or elastic layer, when the fixing belt is bent to have a large curvature, strain is generated in the respective layers of the belt owing to bending deformation. When the belt is circularly driven to generate strain repeatedly in the electroconductive metal layer, in some cases, owing to the fatigue of the electroconductive metal layer, cracks or permanent deformation is caused. When such cracks are generated, the electroconductivity of the electroconductive metal layer is remarkably deteriorated, resulting in it being incapable of efficiently generating heat.

The fixing belt of an aspect of the invention uses the laminated body of an aspect of the invention and includes a metal layer that includes an electroconductive metal layer, wherein each side of the electroconductive metal layer is provided with a metal oxide layer, and the surface of each of the metal oxide layers is provided with a resin layer or an elastic layer. Accordingly, since the shape-sustaining properties of the metal layer with respect to external continuous pressure or deformation in the laminated body are exhibited, occurrence of cracks in the metal layer may be inhibited, even when the fixing belt is driven circularly, and thus heat generation due to electromagnetic induction can be maintained.

Figure 2:
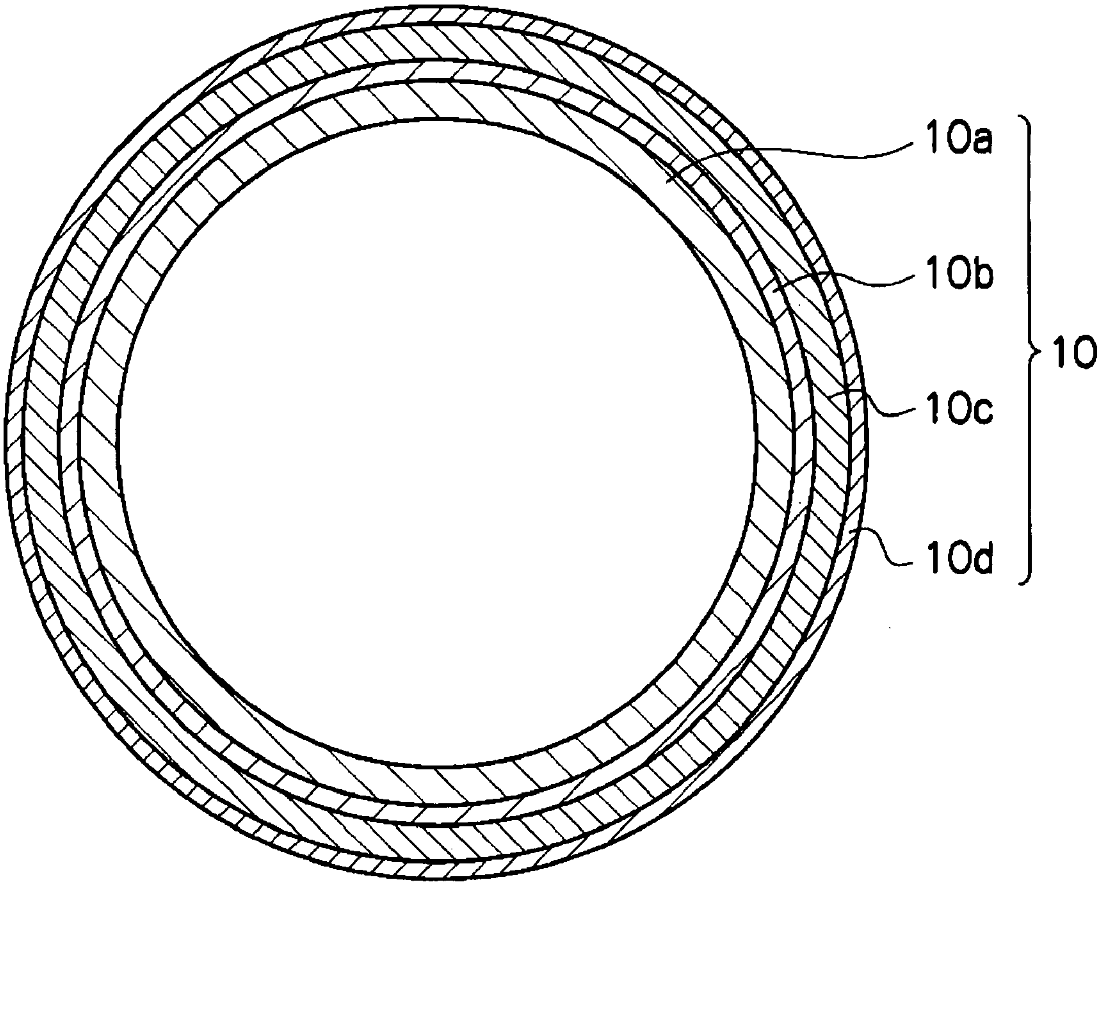
FIG. 2 is a schematic sectional view showing an example of a configuration of a fixing belt of an aspect of the invention.

FIG. 2 is a schematic sectional view showing an example of a configuration of a fixing belt of an aspect of the invention and shows an endless belt with a four-layer structure.

As shown in FIG. 2, a fixing belt 10 includes a resin layer 10*a*, a metal layer 10*b*, an elastic layer 10*c* and a releasing layer 10*d* disposed in this order from an inner periphery side. The resin layer 10*a*, metal layer 10*b* and elastic layer 10*c* form a laminated body of an aspect of the invention.

Accordingly, constituent materials of the resin layer 10*a*, metal layer 10*b* and elastic layer 10*c* and forming methods thereof follow contents described in the laminated body. On the other hand, the releasing layer 10*d*, as far as it has a releasing property with respect to toner, is not particularly restricted. As a main material that is included in the releasing layer 10*d*, a fluororesin excellent in releasing properties and heat resistance may be used.

A method of forming the releasing layer 10*d* when the fixing belt is prepared is not particularly restricted. For instance, a releasing layer 10*d* may be directly formed on an outer periphery surface of the elastic layer 10*c* by making use of various kinds of coating methods or may be formed by laminating a tube prepared in advance by means of extrusion molding or the like on an outer periphery surface of the elastic layer 10*c*.

In the fixing belt of an aspect of the invention as well, in order to obtain a metal layer with a high strength, a metal substrate may be formed by use of a method utilizing plastic deformation, and then both surfaces thereof may be oxidized to form a metal layer including an electroconductive metal layer having a film thickness of approximately 10 μm, thereby forming a fixing belt.

<Fixing Device>

In the next place, a fixing device that uses the fixing belt of an aspect of the invention will be described.

The fixing device of an aspect of the invention includes at least: the fixing belt of an aspect of the invention including a metal layer; a pressure member pressed against an outer periphery surface of the fixing belt; and a heat generating unit that generates an eddy current in the metal layer. The heat generating unit may be, for instance, an electromagnetic induction coil.

The fixing device of an aspect of the invention is not particularly restricted as far as it has, as mentioned above, at least a fixing belt, a pressure member and an electromagnetic induction coil. However, as needs arise, the fixing device may have a cleaning member such as a metal blade and other members and devices such as a fixing pad. A shape of the pressure member is not particularly restricted as far as it can rotate; that is, a roll shape or belt shape may be used.

In the next place, a specific example of a fixing device of an aspect of the invention will be described with reference to the drawings. However, a heating/fixing device that uses the fixing belt of an aspect of the invention is not restricted to configurations shown in a description below.

Figure 3:
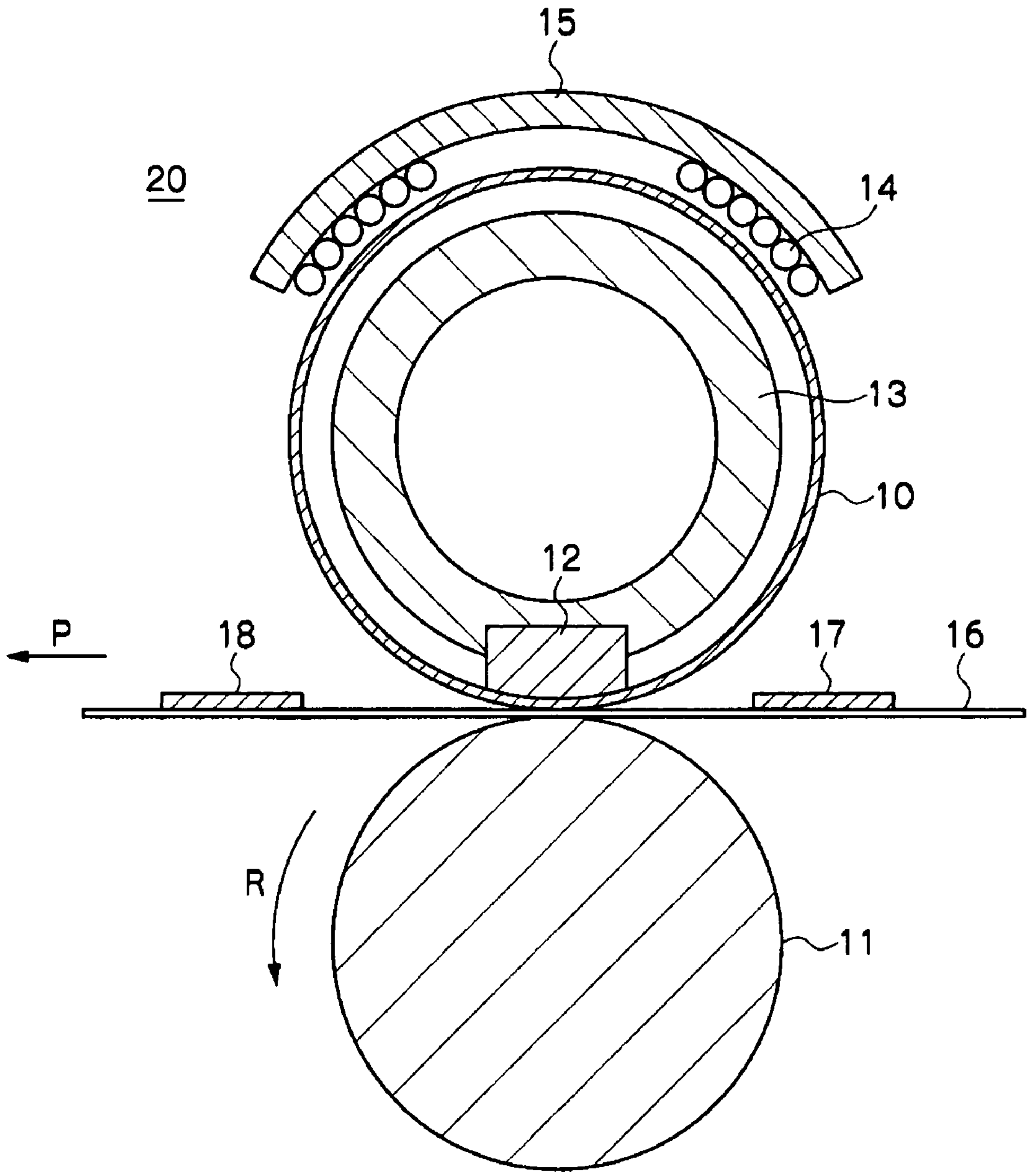
FIG. 3 is a schematic sectional view showing an example of a configuration of a fixing device of an aspect of the invention.

FIG. 3 is a schematic sectional view showing an example of a configuration of a fixing device of an aspect of the invention. In FIG. 3, reference numerals 10, 11, 12, 13, 14, 15, 16, 17 18 and 20, respectively denote a fixing belt, a pressure roller (pressure member), a fixing pad, a support member, a coil (electromagnetic induction coil), a coil support member, a recording medium, an unfixed toner image, an image and a fixing device.

The fixing device 20 includes the fixing belt 10, pressure roller 11, fixing pad 12, support member 13, coil 14 and coil support member 15.

The pressure roller 11 can be rotated in an arrow mark direction R by a not-shown driving source. The fixing belt 10 and the pressure roller 11 are brought into contact under pressure so as to allow inserting the recording medium 16. As the pressure roller 11 is rotated in an arrow mark R direction, the fixing belt 10 can be rotated following the rotation of the pressure roller 11. On an inner peripheral surface of the fixing belt 10, the fixing pad 12 is disposed so as to come into contact with the inner peripheral surface of the fixing belt 10 to apply pressure on a surface of the pressure roller 11 that is in contact with an outer peripheral surface of the fixing belt 10 at the pressure contact portion. Furthermore, the fixing pad 12 is fixed by means of the support member disposed on an inner peripheral surface of the endless belt 10.

On the other hand, the coil 14 is disposed so as to come close to an outer periphery surface of the fixing belt 10 on a side opposite to the fixing pad 12 relative to the support member 13. Furthermore, the coil 14 is fixed by means of the coil support member 15 disposed on a side opposite to an outer periphery surface of the fixing belt 10 relative to the coil 14. The coil 14 is connected to a not shown power supply and, when an AC current is fed to the coil 14, can generate a magnetic field orthogonal to an outer periphery surface of the fixing belt 10 in the coil 14. The magnetic field is varied by means of a not shown exciting circuit so as to generate an eddy current in the metal layer included in the fixing belt 10.

In the next place, a process by which the fixing device 20 fixes an unfixed toner image 17 formed on a surface of the recording medium 16 to form an image 18 on the surface of the recording medium 16 will be described.

As the pressure roller 11 rotates in a direction of arrow mark R, the fixing belt 10 rotates following the pressure roller and is exposed to a magnetic field generated by the coil 14. At this time, the coil 14 generates an eddy current in the metal layer in the fixing belt 10 and thereby an outer periphery surface of the fixing belt 10 is heated to a temperature that is capable of fixing (approximately 150 to 200° C.).

Thus heated fixing belt 10 moves up to the pressure contact portion with the pressure roller 11. Meanwhile, by means of a not shown conveying unit, a recording medium 16 on a surface of which an unfixed toner image 17 is formed is conveyed in an arrow mark direction P. When the recording medium 16 goes past the pressure contact portion, the unfixed toner image 17 is heated by the fixing belt 10 and fixed on a surface of the recording medium 16. Then, the recording medium 16 on a surface of which an image 18 is formed is conveyed by means of the not shown conveying unit in an arrow mark direction P and exhausted from the fixing device 20. Furthermore, the fixing belt 10 that has completed a fixing process in the pressure contact portion and of which surface temperature on an outer periphery surface has come down is rotated in a direction of the coil 14 to be heated again for the next fixing process.

<Image Forming Device>

In the next place, an image forming device of an aspect of the invention will be described.

The image forming device of an aspect of the invention includes: an image holding member; a charging unit that charges a surface of the image holding member; a latent image forming unit that forms a latent image on a surface of the image holding member; a developing unit that develops the formed latent image to form a toner image; a transferring unit that transfers the toner image onto a recording medium; and a fixing unit that heats and fixes the toner image on the recording medium. In the image forming device of an aspect of the invention, the fixing unit includes the fixing device of an aspect of the invention.

Figure 4:
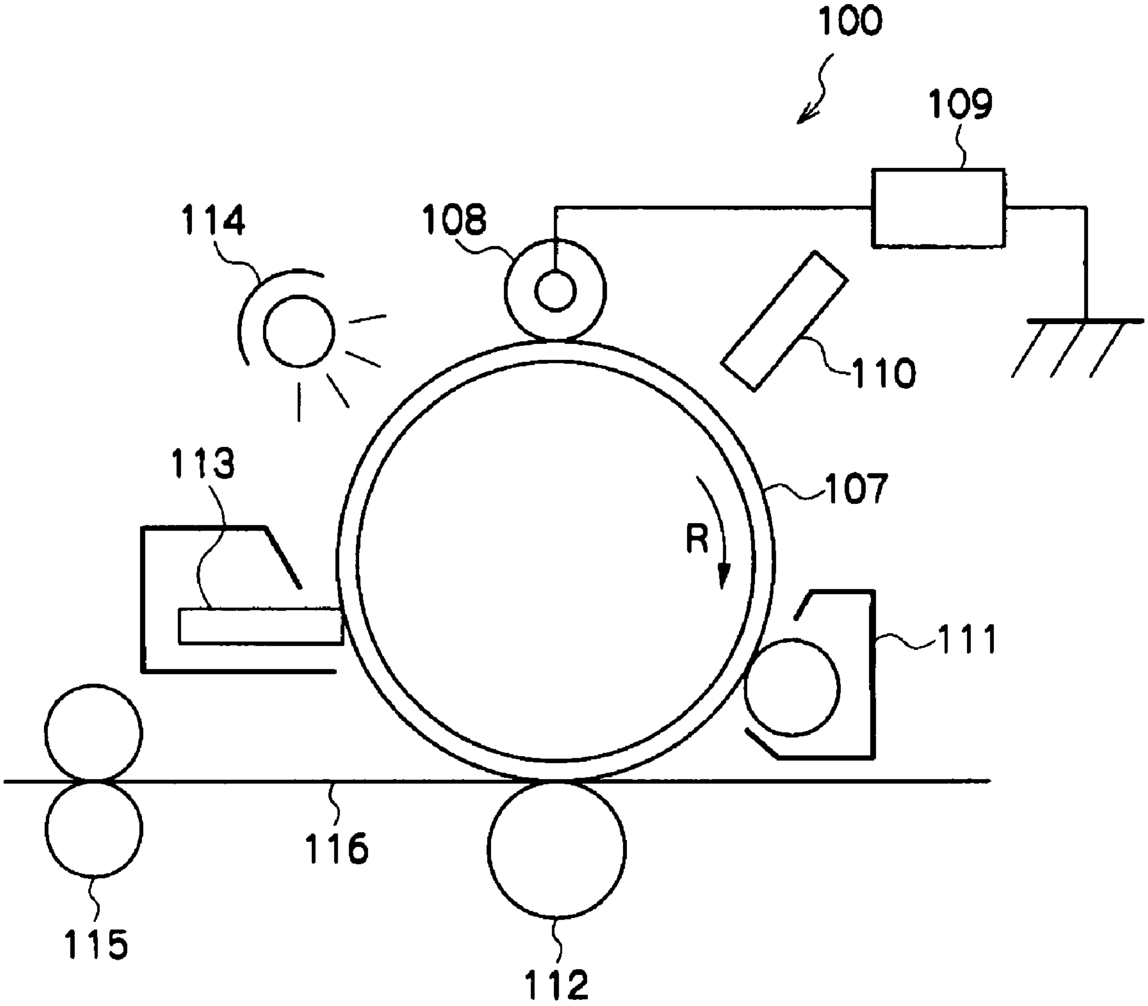
FIG. 4 is a schematic configurational diagram showing an example of an image forming device of an aspect of the invention.

FIG. 4 is a schematic configurational diagram showing an example of an image forming device of an aspect of the invention. An image forming device 100 shown in FIG. 4 includes: an electrophotographic photoreceptor (image holding member) 107; a charging device (charging unit) 108 that charges the electrophotographic photoreceptor 107 by means of a contact charging method; a power supply 109 that is connected to the charging device 108 and supplies electric power to the charging device 108; an exposing device (latent image forming unit) 110 that exposes a surface of the electrophotographic photoreceptor 107 charged by the charging device 108 to form an electrostatic latent image on a surface of the electrophotographic photoreceptor 107; a developing device (developing unit) 111 that develops the electrostatic latent image formed by the exposing device 110 with toner to form a toner image; a transferring device (transferring unit) 112 that transfers the toner image formed by the developing device 111 onto a recording medium; a cleaning device 113; a neutralization device 114; and a fixing device (fixing unit) 115. The fixing device 115 expresses the fixing device 20 described with referencing to FIG. 3 in block.

Furthermore, though not shown in FIG. 4, a toner supply device that supplies toner to the developing device 111 is included as well.

The charging device 108 brings a charging roll into contact with a surface of the electrophotographic photoreceptor 107 to apply a voltage to the photoreceptor to charge a surface of the photoreceptor to a predetermined potential. When the electrophotographic photoreceptor 107 is charged with the charging roll, a charging bias voltage is applied to the charging roll. The applied voltage may be a direct current voltage or one obtained by superposing an AC voltage to a direct current voltage. In the image forming device of an aspect of the invention, a contact charging method that uses, other than the charging roll, a charging brush, a charging film or a charging tube as well may be used to charge, or a non-contact method that uses a corotron or scorotron as well may be used to charge.

As the exposing device 110, in the embodiment, a device in which a surface of the electrophotographic photoreceptor 107 is exposed with a semiconductor laser is used. However, other than this, an optical system device that can expose in a desired image style using a light source such as an LED (light-emitting diode) or a liquid crystal shutter can be used.

As the developing device 111, a generally used developing device in which, with magnetic or nonmagnetic one component developer or two component developer, contact or non-contact developing is carried out is used. However, the developing device is not particularly restricted and can be selected depending on an object.

As the transferring device 112, a roller contact-charging member is used. However, other than this, a contact transfer charger that uses a belt, film, rubber blade or the like, or a scorotron transfer charger or a corotron transfer charger that makes use of the corona discharge may be used.

The cleaning device 113 is a device for removing a residual toner stuck to the surface of the electrophotographic photoreceptor 107 after a transfer step, and the electrophotographic photoreceptor 107 of which surface was cleansed thereby can be repeatedly used in the above-mentioned image formation process. As the cleaning device, other than the cleaning blade type device shown in the figure, a brush cleaning type device, a roll cleaning type device or the like can be used. Among these, a cleaning blade type device is preferred. Materials for the cleaning blade may be urethane rubber, neoprene rubber, silicone rubber or the like.

Then, an image forming process in the image forming device 100 will be briefly described.

The charging device 108 charges a surface of the electrophotographic photoreceptor 107 that rotates in an arrow mark direction R. When laser light or the like emitted from the exposing device 110 in accordance with image information is irradiated on a surface of the charged electrophotographic photoreceptor 107, a latent image is formed. The latent image formed on the surface of the electrophotographic photoreceptor 107, when toner is imparted thereto by a developing apparatus provided to the developing device 111, can be visualized as a toner image. The toner image thus formed on the surface of the electrophotographic photoreceptor 107, at a pressure contact portion between the surface of the electrophotographic photoreceptor 107 and the transfer device 112, is transferred onto the recording medium 116 by a bias voltage applied between the electrophotographic photoreceptor 107 and the transfer roll. The transferred toner image is conveyed to the fixing device 115 and fixed on the recording medium 116. The fixing mechanism is the same as that described in the fixing device.

On the other hand, a surface of the electrophotographic photoreceptor 107 after the transfer is cleansed by means of the cleaning device 113 and prepared for the formation of a toner image corresponding to subsequent image information.

Furthermore, the image forming device 100, as shown in FIG. 4, is provided with a neutralization device (erase light irradiating device) 114, and thereby, when the electrophotographic photoreceptor 107 is repeatedly used, a residual potential of the electrophotographic photoreceptor 107 can be inhibited from bringing into a next image forming cycle; accordingly, image quality can be heightened further.

EXAMPLES

In what follows, the invention will be more specifically described with reference to examples. However, the invention is not restricted to examples below.

Example 1

(Preparation of Fixing Belt (Laminated Body)>

-Metal Layer-

An oxygen-free copper sheet having a thickness of 0.5 mm is subjected to pressing and deep drawing to form into a cylindrical vessel, followed by subjecting to rotary forming to obtain an endless belt (metal substrate) haying an inner diameter of 30 mm, a length of 340 mm and a thickness of 50 μm. The endless belt is further heat-treated in an oxidizing atmosphere set at 200° C. for 24 hr to form a metal oxide layer having a thickness of 20 μm on each surface of the copper endless belt, and thereby a metal layer with a 10 μm thick electroconductive metal layer made of copper sandwiched between two metal oxide layers is obtained. When a section of the metal substrate is observed with SEM (10000 times), in the electroconductive metal layer, crystals oriented in a direction that forms an angle of 0° to a surface of the metal substrate are found.

-Resin Layer-

The metal layer that is an endless belt, with an outer surface thereof masked with a PTFE resin tape, is dipped in a polyimide precursor solution (trade name: U Varnish S, produced by Ube Industries, Ltd.,) to coat and thereby a coated film is formed on an inner surface of the metal layer. Then, the coated film is dried at 100° C. for 30 min to vaporize a solvent in the coated film, followed by baking at 380° C. for 30 min to imidize, and thereby a polyimide film (resin layer) having a film thickness of 50 μm is formed.

-Elastic Layer-

In the next place, on an outer surface of the metal layer from which the PTFE resin tape used for masking has been peeled, a liquid silicone rubber (trade name: KE1940-35, liquid silicone rubber A35, produced by Shin-Etsu Chemical Co., Ltd.) that is prepared so that the durometer hardness may be A35 after curing is coated by the ring coat method so that a film thickness may be 200 μm, followed by drying, and thereby a dry liquid silicone rubber layer is formed.

-Releasing Layer-

On a surface of the dry liquid silicone rubber layer, a tetrafluoroethylene perfluoro(alkyl vinyl ether) copolymer (PFA) dispersion (trade name: 500CL, produced by DuPont-Mitsui Fluorochemicals Company, Ltd.) is coated so that a film thickness may be 30 μm, followed by sintering at 380° C. to form an elastic layer made of silicone rubber (film thickness: 200 μm) and a PFA releasing layer (film thickness: 30 μm), and thereby fixing belt 1 is obtained.

(Preparation of Pressure Roll)

A fluororesin tube having an outer diameter of 50 mm, a length of 340 mm and a thickness of 30 μm, on an inner surface of which an adhering primer is coated, and a hollow metal core bar are set in a molding die. Then, a liquid foaming silicone rubber is injected between the fluororesin tube and the core bar so that a layer thickness may be 2 mm, followed by heating at 150° C. for 2 hr to cure and foam the silicone rubber, and thereby a pressure roll having rubber elasticity (durometer hardness: C7) is obtained.

(Evaluation)

A fixing device shown in FIG. 3 equipped with fixing belt 1 and the pressure roll is attached to an image forming device (trade name: DOCUPRINT C620, produced by Fuji Xerox Co., Ltd.). In the next place, by use of the image forming device, the endurance evaluation in which continuous rotation of the fixing belt heated by electromagnetic induction heating (surface temperature: 170° C.) with no load is carried out, is performed to evaluate heat generation sustaining properties of the fixing belt.

At the evaluation, while a temperature at a center portion in a width direction of the fixing belt is being confirmed with a non-contact infrared radiation thermometer (produced by Keyence Corporation.), a time where a temperature of the portion becomes 100° C. or less is measured. Furthermore, with a test piece of 1 cm×1 cm is cut from the fixing belt, the occurrence of cracks in the metal layer is confirmed by observing a section of the metal layer in the test piece with an optical microscope (magnification: 500 times). Evaluation is carried out based on the following evaluation criteria.

A: No crack is found.

B: One to five cracks are found.

C: Six or more cracks are found.

Results are shown in Table 1.

Example 2

Fixing belt 2 is prepared as in a similar manner to Example 1 except that, in the preparation of the fixing belt of Example 1, in place of an oxygen-free copper sheet, carbon steel is used to prepare an endless belt having a thickness of 60 μm, followed by heating it at 250° C. in an oxidizing atmosphere for 30 hr to form a metal oxide layer having a thickness of 20 μm on each side of the endless belt made of carbon steel, to form a metal layer.

The evaluation of fixing belt 2 is carried out in a similar manner to the evaluation in Example 1. Results are shown in Table 1.

Example 3

Fixing belt 3 is prepared in a similar manner to Example 1 except that, in the preparation of the fixing belt of Example 1, in place of an oxygen-free copper sheet, copper-nickel (30%) alloy is used to prepare an endless belt having a thickness of 50 μm, followed by heating at 220° C. in an oxidizing atmosphere for 24 hr to form a metal oxide layer having a thickness of 15 m on each side of the endless belt made of copper-nickel, to form a metal layer (thickness of electroconductive metal layer: 20 μm).

The evaluation of fixing belt 2 is carried out in a similar manner to the evaluation in Example 1. Results are shown in Table 1.

Example 4

(Preparation of Fixing Belt)

In the beginning, on an outer periphery surface of a vinyl chloride base having an outer diameter of 30 mm and a length of 340 mm, an electroless copper plating film having a film thickness of 0.3 μm is formed and, with the plating film as an electrode, an electrolyte copper plating film having a film thickness of 50 μm is formed to form a copper film having a film thickness of 50 μm. When this is removed from the base, an endless belt (metal substrate) is obtained. The copper endless belt is subjected to oxidization treatment similarly to Example 1 and thereby a metal layer with a metal oxide layer having a thickness of 20 μm formed on each side thereof is obtained. When a section of the metal layer is observed with SEM (10000 times), in the metal layer, crystals oriented in a direction that forms an angle of 90° to a surface of the metal substrate are found.

Except that the metal layer is used, in a similar manner to Example 1, fixing belt 4 with a resin layer on one side and a releasing layer and an elastic layer on the other side is obtained.

(Evaluation)

Fixing belt 4 is evaluated in a similar manner to the evaluation of the fixing belt in Example 1. Results are shown in Table 1.

Comparative Example 1

On a surface of a cylindrical stainless die having an outer diameter of 30 mm, a polyimide precursor solution (trade name: U Varnish S, produced by Ube Industries, Ltd.,) is coated by means of a dipping method to form a coated film. Then, the coated film is dried at 100° C. for 30 min to vaporize a solvent in the coated film, followed by baking at 380° C. for 30 min to imidize, and thereby a polyimide film having a film thickness of 50 μm is formed. After cooling, the polyimide film is peeled off a surface of the stainless die and thereby a polyimide heat resistant base (resin layer) having an inner diameter of 30 mm, a film thickness of 50 μm and a length of 340 mm is obtained.

In the next place, on an outer periphery surface of the heat resistant base, an electroless copper plating film having a film thickness of 0.3 μm is formed and, with the plating film as an electrode, an electrolyte copper plating film having a film thickness of 10 μm is formed. Furthermore, in a similar manner to the preparation of the fixing belt in Example 1, on a surface of the copper plating film, an elastic layer and a releasing layer are formed to obtain fixing belt 5.

In a similar manner to the evaluation in Example 1, the evaluation of fixing belt 5 is carried out. Results are shown together in Table 1.

Comparative Example 2

Fixing belt 6 is obtained in a similar manner to Comparative Example 1 except that, in Comparative Example 1, on an outer periphery surface of the heat resistant base, an electrolyte copper plating film having a film thickness of 30 μm is formed, followed by heating this in an oxidizing atmosphere at 200° C. for 24 hr to form a metal oxide layer having a thickness of 20 μm on a surface of the copper plating film, and an elastic layer is formed on a surface thereof. In a similar manner to the evaluation in Example 1, the evaluation of fixing belt 6 is carried out. Results are shown in Table 1.

Comparative Example 3

A fixing belt 7 is obtained in a similar manner to Comparative Example 1, except that, in Comparative Example 1, on an outer periphery surface of a heat resistant base, an electrolyte copper plating film having a film thickness of 10 μm is formed, followed by forming thereon an electroless nickel plating film having a film thickness of 0.3 μm, with the plating film as an electrode, an electrolyte nickel plating protective film having a film thickness of 15 μm is formed, and an elastic layer is formed thereon.

In a similar manner to the evaluation in Example 1, the evaluation of fixing belt 7 is carried out. Results are shown in Table 1.

TABLE 1

| | Electroconductive Metal Layer | | | Evaluation | |
|---|---|---|---|---|---|
| | Material | Thickness (μm) | Other Layers | Endurance Time (hr) | State of Metal Layer |
| Example 1 | Copper (rolled) | 10 | Metal Oxide (double-sided) | 200 or more | A |
| Example 2 | Carbon Steel (rolled) | 20 | Metal Oxide (double-sided) | 200 or more | A |
| Example 3 | Copper-nickel (rolled) | 20 | Metal Oxide (double-sided) | 200 or more | A |
| Example 4 | Copper (plated) | 10 | Metal Oxide (double-sided) | 140 | A |
| Comparative Example 1 | Copper (plated) | 10 | — | 50 | C |
| Comparative Example 2 | Copper (plated) | 10 | Metal Oxide (single-sided) | 70 | C |
| Comparative Example 3 | Copper (plated) | 10 | Ni Protective Layer | 30 | C |

As shown in Table 1, it is found that the fixing belts (laminated bodies) prepared in the Examples are able to maintain a heat generation state without causing cracks in the metal layer, even after a long period of no load operation while heated by an electromagnetic induction fixing device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A laminated body comprising:

a metal layer comprising an electroconductive metal layer and a metal oxide layer disposed on each side of the electroconductive metal layer; and a resin layer or an elastic layer disposed on at least one side of the metal layer, wherein the entire metal layer is rolled, such that metal crystals of the electroconductive metal layer are arranged in a plane direction of the electroconductive metal layer.

2. The laminated body according to claim 1, wherein the volume resistivity of the electroconductive metal layer is about $1\times10^{3}$ Ωcm or less.

3. The laminated body according to claim 1, wherein the electroconductive metal layer includes copper, nickel, iron, aluminum, titanium, cobalt, tin, lead or an alloy containing one or more thereof.

4. The laminated body according to claim 1, wherein a thickness of the electroconductive metal layer is approximately in the range of 3 to 70 μm.

5. The laminated body according to claim 1, wherein a thickness of the metal oxide layer is approximately in the range of 1 to 30 μm.

6. The laminated body according to claim 1, wherein the volume resistivity of the metal oxide layer is about $1\times10^{8}$ Ωcm or more.

7. The laminated body according to claim 1, wherein a total thickness of the electroconductive metal layer and the metal oxide layers is approximately in the range of 40 to 50 μm.

8. The laminated body according to claim 1, wherein the resin layer includes one selected from a fluororesin, a silicone resin, a polyimide resin, a polyamide resin or a polyamide-imide resin.

9. The laminated body according to claim 1, wherein a thickness of the resin layer is approximately in the range of 30 to 200 μm.

10. The laminated body according to claim 1, wherein the elastic layer includes a silicone rubber or a fluororubber.

11. The laminated body according to claim 1, wherein a thickness of the elastic layer is approximately in the range of 30 to 500 μm.

12. The laminated body according to claim 1, wherein the hardness of the elastic layer is approximately in the range of A5 to A40 by a durometer hardness test using a type A durometer.

13. A fixing belt, comprising the laminated body according to claim 1.

14. A fixing device, comprising:

a fixing belt comprising the laminated body according to claim 1;

a pressure member pressed against an outer periphery surface of the fixing belt; and a heat generating unit that generates an eddy current in the metal layer to allow the fixing belt to generate heat.

15. An image forming device, comprising:

an image holding member;

a charging unit that charges a surface of the image holding member;

a latent image forming unit that forms a latent image on a surface of the image holding member;

a developing unit that develops the formed latent image to form a toner image;

a transferring unit that transfers the toner image onto a recording medium; and a fixing unit that fixes the toner image on the recording medium, wherein the fixing unit includes: a fixing belt comprising the laminated body according to claim 1;

a pressure member pressed against an outer periphery surface of the fixing belt; and a heat generating unit that generates an eddy current in the metal layer to allow the fixing belt to generate heat.

16. The laminated body according to claim 1, wherein the resin layer is disposed on one side of the metal layer and the elastic layer is disposed on the other side of the metal layer.

* * * * *